US011039005B2

(12) United States Patent
Huh et al.

(10) Patent No.: US 11,039,005 B2
(45) Date of Patent: Jun. 15, 2021

(54) METHOD, ELECTRONIC DEVICE AND STORAGE MEDIUM FOR UNLOCKING ELECTRONIC DEVICE BASED ON LOCATION

(71) Applicants: SAMSUNG ELECTRONICS CO., LTD., Suwon-si (KR); RESEARCH & BUSINESS FOUNDATION SUNGKYUNKWAN UNIVERSITY, Suwon-si (KR)

(72) Inventors: Junho Huh, Suwon-si (KR); Ilyoup Kwak, Suwon-si (KR); Hyoungshick Kim, Suwon-si (KR); Woojin Park, Suwon-si (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

(*) Notice: Subject to any disclaimer, the term of this patent is extended or adjusted under 35 U.S.C. 154(b) by 0 days.

(21) Appl. No.: 16/719,330

(22) Filed: Dec. 18, 2019

(65) Prior Publication Data
US 2020/0195772 A1 Jun. 18, 2020

(30) Foreign Application Priority Data
Dec. 18, 2018 (KR) .................. 10-2018-0164177

(51) Int. Cl.
*H04M 1/72457* (2021.01)
*H04W 4/021* (2018.01)
(Continued)

(52) U.S. Cl.
CPC ...... *H04M 1/72457* (2021.01); *H04B 17/318* (2015.01); *H04M 1/72454* (2021.01);
(Continued)

(58) Field of Classification Search
CPC ............. H04M 1/725; H04M 2250/10; H04M 1/72572; H04M 1/72569; H04M 1/724;
(Continued)

(56) References Cited

U.S. PATENT DOCUMENTS 8,302,152 B1 * 10/2012 Hewinson ..................... 726/1
8,712,392 B2 * 4/2014 Kim ............................ 455/418
(Continued)

FOREIGN PATENT DOCUMENTS

| JP | 2012129881 A | 7/2012 |
| KR | 101169659 B1 | 8/2012 |
| KR | 1020140020569 A | 2/2014 |

OTHER PUBLICATIONS

International Search Report (PCT/ISA/210) issued from the International Bureau in counterpart International Application No. PCT/KR2019/018010 dated Apr. 28, 2020.
(Continued)

*Primary Examiner* — Meless N Zewdu
(74) *Attorney, Agent, or Firm* — Sughrue Mion, PLLC

(57) ABSTRACT

Disclosed are a location-based operation method, an electronic device, and a recording medium. The electronic device may include a memory storing instructions; and a processor configured to execute the instructions to: identify a first location of the electronic device based on first communication information; obtain, based on the identified first location being identified as being included in a second location area that is adjacent to and includes a first location area, second communication information; identify a second location of the electronic device based on at least a part of the obtained second communication information; and change a locked state of the electronic device to an unlocked state, based on the second location of the electronic device being identified as being included in the first location area.

20 Claims, 13 Drawing Sheets

(51) Int. Cl.
| | |
|---|---|
| *H04W 4/02* | (2018.01) |
| *H04W 48/04* | (2009.01) |
| *H04W 12/08* | (2021.01) |
| *H04B 17/318* | (2015.01) |
| *H04M 1/72454* | (2021.01) |
| *H04W 12/37* | (2021.01) |
| *H04W 12/63* | (2021.01) |

(52) U.S. Cl.
CPC ........... *H04W 4/021* (2013.01); *H04W 4/023* (2013.01); *H04W 12/08* (2013.01); *H04W 12/37* (2021.01); *H04W 12/63* (2021.01); *H04W 48/04* (2013.01); *H04M 2250/10* (2013.01)

(58) Field of Classification Search
CPC ......... H04M 1/72457; H04M 1/72454; H04M 1/67; H04M 1/72448; H04M 1/72; H04B 17/318; H04B 17/309; H04W 4/021; H04W 4/02; H04W 48/04; H04W 12/00; H04W 12/08; H04W 12/0027; H04W 4/023; H04W 12/00503; H04W 4/029; H04W 4/025; H04W 12/1004; H04W 64/00; H04W 88/02; H04W 12/06; H04W 4/80; H04W 12/63; H04W 12/37; H04W 12/086; H04W 12/062; H04W 12/065; H04W 12/088; H04W 12/10; H04W 12/104; H04W 12/128; H04W 12/30; H04W 12/64; H04W 12/65; H04W 12/79; H04W 12/60; H04W 12/47; H04W 88/00; H04W 88/08; H04W 92/00; H04W 92/08; H04W 48/00; H04W 48/10; H04W 48/02
See application file for complete search history.

(56) References Cited

U.S. PATENT DOCUMENTS

| | | | |
|---|---|---|---|
| 9,848,329 B2* | 12/2017 | Nade | H04W 12/08 |
| 10,013,546 B1* | 7/2018 | Johansson et al. | G06F 21/36 |
| 10,171,496 B2* | 1/2019 | Whitsell et al. | H04L 63/1483 |
| 10,726,159 B2* | 7/2020 | Suzuki et al. | G06F 21/629 |
| 2012/0157048 A1 | 6/2012 | Ikeda et al. | |
| 2012/0239950 A1* | 9/2012 | Davis et al. | 713/320 |
| 2013/0053105 A1* | 2/2013 | Lee et al. | 455/565 |
| 2014/0047536 A1 | 2/2014 | Jung et al. | |
| 2014/0364085 A1* | 12/2014 | Garcia | H04W 12/08 |
| 2015/0052133 A1* | 2/2015 | Hewinson | H04L 63/10 |
| 2015/0281950 A1* | 10/2015 | Carr | H04W 12/02 |
| 2016/0054912 A1* | 2/2016 | Park et al. | G06F 3/04847 |
| 2017/0031542 A1* | 2/2017 | Ryu et al. | G06F 3/0482 |
| 2018/0192374 A1 | 7/2018 | Jain et al. | |
| 2018/0276630 A1* | 9/2018 | Kim et al. | G06Q 20/40 |

OTHER PUBLICATIONS

Written Opinion (PCT/ISA/237) issued from the International Bureau in counterpart International Application No. PCT/KR2019/018010 dated Apr. 28, 2020.

\* cited by examiner

|   | AP1 | AP2 | AP3 | AP4 | AP5 |
|---|---|---|---|---|---|
| μ | -65 | -50 | -62 | -80 | -75 |

FIG.7A

| TIME | AP NAME | AP SIGNAL STRENGTH |
|---|---|---|
| 00:01 | aa:bb:ac:12 (AP1) | -80 |
| 00:01 | aa:bb:cc:12 (AP2) | -40 |
| 00:01 | aa:cc:ab:12 (AP4) | -75 |
| 00:02 | aa:bf:ac:13 (AP5) | -82 |
| ⋮ | ⋮ | ⋮ |

FIG.7B

|   | AP1 | AP2 | AP3 | AP4 | AP5 | Score |
|---|---|---|---|---|---|---|
| $x_1$ | -80 | -40 | 0 | -75 | -82 | 10.66 |
| $x_2$ | -76 | 0(-40) | -50 | -79 | 0(-82) | 9.11 |
| $x_3$ | 0(-76) | -45 | -53 | 0(-79) | 0(-82) | 7.44 |
| $x_4$ | -68 | 0(-45) | 0(-53) | -80 | -77 | 4.88 |
| $x_5$ | -64 | -52 | -61 | 0(-80) | -75 | 1.10 |

FIG.7C

METHOD, ELECTRONIC DEVICE AND STORAGE MEDIUM FOR UNLOCKING ELECTRONIC DEVICE BASED ON LOCATION

CROSS-REFERENCE TO RELATED APPLICATION(S)

This application is based on and claims priority under 35 U.S.C. § 119 to Korean Patent Application No. 10-2018-0164177, filed on Dec. 18, 2018, in the Korean Intellectual Property Office, the disclosure of which is incorporated by reference herein in its entirety.

BACKGROUND

1. Field

The disclosure relates to a method, an electronic device, and a recording medium, which are for providing a location-based operation.

2. Description of Related Art

Electronic devices have recently been developed in various forms for convenience of users, and with various location-based functions (services). The location-based services may trace a location based on a global positioning system (GPS) signal, and may identify the current location and the movement path of an electronic device or a user that carries the electronic device.

One of the various location-based functions is a function of locking or unlocking an electronic device in a trusted place. The function of locking or unlocking an electronic device in a trusted place may identify the location of the electronic device based on a GPS signal and may provide a locking or unlocking function if the electronic device is identified as being in a predetermined trusted location.

However, the related art location-based locking or unlocking function identifies a location based on a GPS signal. A location area set as a trusted location is very broad. Accordingly, it is difficult to set an accurate area desired by a user, and an electronic device may be unlocked even in a location where a user does not desire to unlock the electronic device. Also, in the case of the related art location-based locking or unlocking function, an electronic device may be unlocked, in a space different from a preset location area by manipulating a GPS signal using special equipment. Accordingly, the related art location-based locking or unlocking function may have a high risk of personal information leaking when the electronic device is lost or the like.

SUMMARY

Provided are an electronic device for providing a function of automatically changing the electronic device to an unlocked state based on a location, an operation method of the electronic device, and a recording medium.

Additional aspects will be set forth in part in the description which follows and, in part, will be apparent from the description, or may be learned by practice of the presented embodiments.

In accordance with an aspect of the disclosure, an electronic device includes: a memory storing instructions; and a processor configured to execute the instructions to: identify a first location of the electronic device based on first communication information; obtain, based on the identified first location being identified as being included in a second location area that is adjacent to and includes a first location area, second communication information; identify a second location of the electronic device based on at least a part of the obtained second communication information; and change a locked state of the electronic device to an unlocked state, based on the second location of the electronic device being identified as being included in the first location area.

The processor may be further configured to execute the instructions to: designate, before identifying the first location, the first location area in a place selected by a user or a place designated based on situation information; and store, in the memory before identifying the first location, first signal strength information related to a strength of at least one access point signal detected in the first location area.

The electronic device may further include a display, wherein the processor may be further configured to execute the instructions to: control the display to display a first object for selecting a function of automatically changing to the unlocked state and a second object indicating at least one place; control the display to display pieces of distance information associated with a place indicated by the second object on the display, based on a selection of the second object; and designate the first location area based on distance information selected from among the displayed pieces of the distance information.

The first communication information may include global positioning system (GPS) information obtained using a first communication scheme, and physical address information of a device of a network that is obtained using a second communication scheme; and the second communication information may include second signal strength information related to a strength of at least one access point signal detected in the first location area.

The processor may be further configured to execute the instructions to: suspend obtaining the second communication information, based on changing from the locked state to the unlocked state in the first location area; detect a movement of the electronic device using at least one sensor of the electronic device; and resume obtaining the second communication information, based on detection of the movement of the electronic device.

The processor may be further configured to execute the instructions to: suspend obtaining the second communication information, based on a movement of the electronic device not being detected during a predetermined period of time using at least one sensor of the electronic device in the unlocked state; and resume obtaining the second communication information, based on the movement of the electronic device being detected.

The processor may be further configured to execute the instructions to: detect a movement of the electronic device using at least one sensor of the electronic device in the unlocked state in the first location area; identify a movement distance from the first location area and behavior information of a user based on situation information of the user, based on detection of the movement of the electronic device; resume obtaining the second communication information, based on the identified movement distance being greater than or equal to a predetermined distance; identify a third location of the, electronic device based on the second communication information obtained by resuming obtaining the second communication information; and return the electronic device from the unlocked state to the locked state, based on the third location of the electronic device being identified as being outside the first location area.

The processor may be further configured to execute the instructions to, in identifying the second location of the electronic device based on the second communication information: detect at least one access point signal in the first location; obtain second signal strength information related to a strength of the at least one detected access point signal at designated time intervals; obtain a similarity value based on the obtained second signal strength information and previously stored first signal strength information; and identify that the second location is included in the first location area, based on the similarity value being less than or equal to a predetermined similarity threshold value.

The processor may be further configured to execute the instructions to, in identifying the second location of the electronic device based on the second communication information: maintain the unlocked state, based on a similarity value being identified as being greater than or equal to a predetermined similarity threshold value in a state in which a movement of the electronic device is not detected.

The electronic device may further include: a display, wherein the processor may be further configured to execute the instructions to control to display, on the display, notification information indicating a change to the unlocked state or a change to the locked state.

In accordance with another aspect of the disclosure, a location-based operation method performed by an electronic device includes: identifying a first location of the electronic device based on first communication information; obtaining, based on the identified first location being identified as being included in a second location area adjacent to and encompassing a first location area, second communication information; identifying a second location of the electronic device, based on at least a part of the obtained second communication information; and changing a locked state of the electronic device to an unlocked state, based on the second location of the electronic device being identified as being included in the first location area.

The method may further include: designating, before identifying the first location, the first location area in a place selected by a user or a place designated based on situation information; and storing, before identifying the first location, first signal strength information related to a strength of at least one access point signal detected in the first location area.

The designating the first location area may include controlling a display of the electronic device to display a first object for selecting a function of automatically changing to the unlocked state and a second object indicating at least one place; controlling the display to display pieces of distance information associated with a place indicated by the second object, based on a selection of the second object; and designating the first location area based on distance information selected from among the displayed pieces of distance information.

The first communication information may include global positioning system (GPS) information obtained using a first communication scheme, and physical address information of a device of a network that is obtained using a second communication scheme; and the second communication information may include second signal strength information related to a strength of at least one access point signal detected in the first location area.

The method may further include: suspending the obtaining of the second communication information, based on the changing the locked state to the unlocked state in the first location area; detecting a movement of the electronic device using at least one sensor of the electronic device; and resuming the obtaining of the second communication information, based on detection of the movement of the electronic device.

The method may further include: suspending the obtaining of the second communication information, based on a movement of the electronic device not being detected during a predetermined period of time using at least one sensor of the electronic device in the unlocked state; and resuming the obtaining of the second communication information, based on the movement of the electronic device being detected.

The method may further include: detecting a movement of the electronic device using at least one sensor of the electronic device in the unlocked state in the first location area; identifying a movement distance from the first location area and behavior information of a user based on situation information of the user, based on detection of the movement of the electronic device; resuming the obtaining of the second communication information, based on the identified movement distance being greater than or equal to a predetermined distance; identifying a third location of the electronic device based on the second communication information obtained by the resuming the obtaining of the second communication information; and controlling the electronic device to return from the unlocked state to the locked state, based on the third location of the electronic device being identified as being outside the first location area.

The identifying the second location of the electronic device based on the obtained second communication information may include: detecting at least one access point signal in the first location; obtaining second signal strength information related to a strength of the at least one detected access point signal at designated time intervals; obtaining a similarity value based on the obtained second signal strength information and previously stored first signal strength information; identifying that the second location is included in the first location area, based on the similarity value being less than or equal to a predetermined similarity threshold value; and maintaining the unlocked state, based on the similarity value being, greater than or equal to the predetermined similarity threshold value in a state in which a movement of the electronic device is not detected.

The method may further include: controlling to display, on a display of the electronic device, notification information for informing changing the locked state to the unlocked state or changing the unlocked state to the locked state.

In accordance with another aspect of the disclosure, a non-transitory computer readable recording medium has recorded thereon instructions executable by a processor of an electronic device to perform a location-based operation method including: identifying a first location of an electronic device based on first communication information; obtaining, based on the identified first location being identified as being included in a second location area adjacent to and encompassing a first location area, second communication information; identifying a second location of the electronic device, based on at least a part of the obtained second communication information; and changing a locked state of the electronic device to an unlocked state, based on the second location of the electronic device being identified as being included in the first location area.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 7A to 7C are diagrams illustrating an example of an operation by an electronic device according to an embodiment;

DETAILED DESCRIPTION

Figure 1:
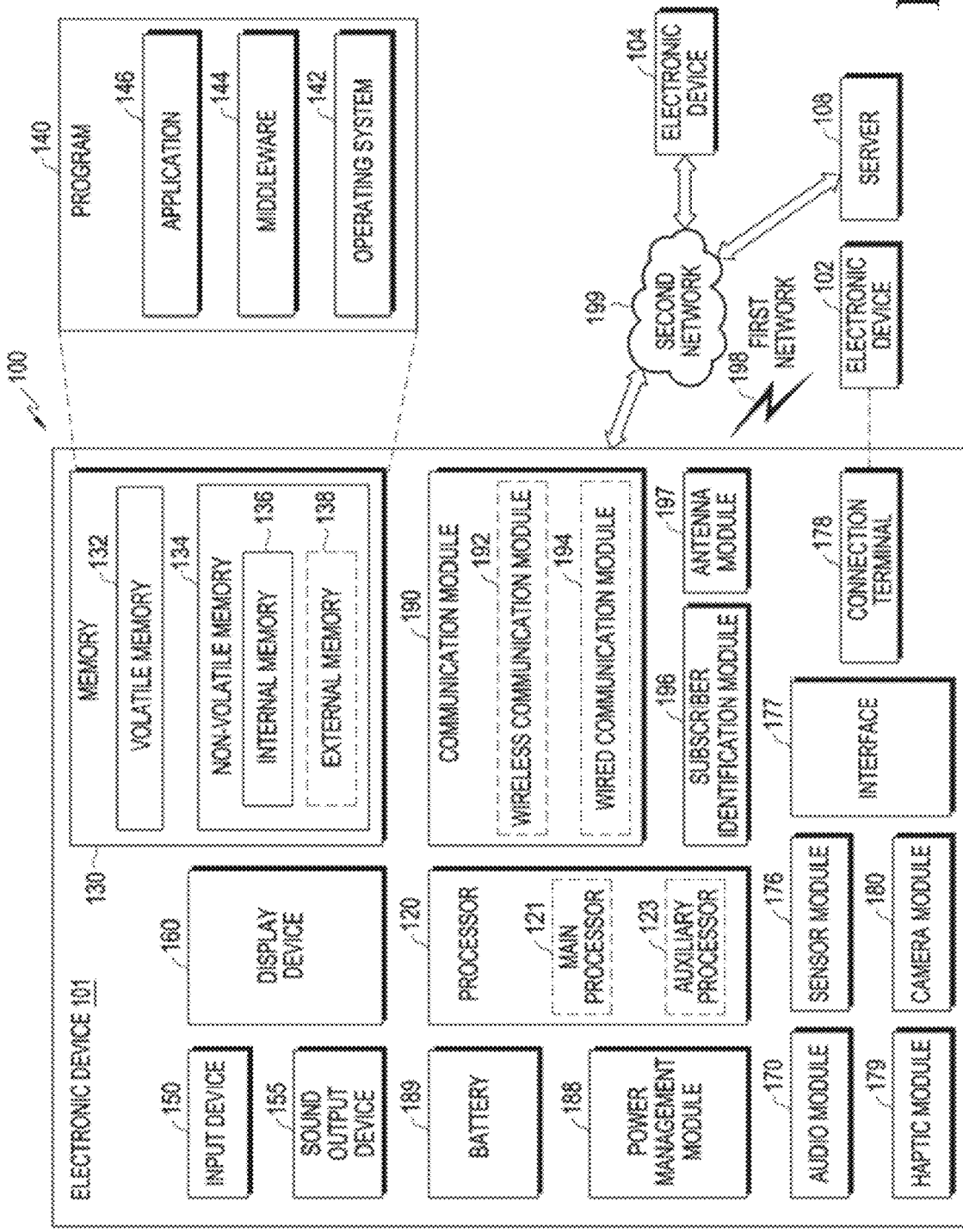
FIG. 1 is a diagram illustrating an example of the configuration of an electronic device and a network environment according to an embodiment.

Electronic devices according to various embodiments may be of various types. The electronic devices may include, for example, a portable communication device (e.g., a smartphone), a computer device, a portable multimedia device, a portable medical device, a camera, a wearable device, a home appliance, etc. It is understood that electronic devices according to embodiments are not limited to those described above.

It should be appreciated that the below description and the terms used therein are not intended to limit the technological features set forth herein to particular embodiments, and include various changes, equivalents, or replacements for a corresponding embodiment. With regard to the description of the drawings, similar reference numerals may be used to refer to similar or related elements. It is to be understood that a singular form of a noun corresponding to an item may include one or more of the noun, unless the relevant context clearly indicates otherwise. As used herein, expressions such as as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in another aspect (e.g, importance or order). It is to be understood that if an element (e.g., a first element) is referred to, with or without the term "operatively" or "communicatively," as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" simply means that the storage medium is a tangible device, and not simply a signal (e.g., an electromagnetic wave), but this term does not differentiate between whether data is semi-permanently stored in the storage medium and whether the data is temporarily stored in the storage medium.

A method according to various embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE™), or between two user devices (e.g., smart phones) directly. If distributed online, at least part of the computer program product may be temporarily generated or at least temporarily stored in the machine-readable storage medium, such as a memory of the manufacturer's server, a server of the application store, a relay server, etc.

Each component (e.g., a module or a program) of the above-described components may include a single entity or multiple entities. Further, one or more of the above-described components may be omitted, or one or more other components may be added in various embodiments. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by a module, a program, or another component may be carried out sequentially, in parallel, repeatedly, or heuristically, or one or more of the operations may be executed in a different order or omitted, or one or more other operations may be added.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. According to an embodiment, the electronic device 101 may include a processor 120 (e.g., at least one processor), memory 130, an input device 150, a sound output device 155, a display device 160, an audio module 170 (e.g., audio circuitry or audio device), a sensor module 176 (e.g., sensor or sensor circuitry), an interface 177, a haptic module 179 (e.g., haptic device or haptic circuitry), a camera module 180 (e.g., camera or camera circuitry), a power management module 188 (e.g., power manager), a battery 189, a communication module 190 (e.g., communicator, communication circuitry, or communication interface), a subscriber identification module (SIM) 196, and an antenna module 197 (e.g., antenna, antenna circuitry, or antenna interface). In some embodiments, at least one (e.g., the display device 160 or the camera module 180) of the components may be omitted from the electronic device 101, or one or more other components may be added in the electronic device 101. Furthermore, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may, for example, execute software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that, is operable independently from, or in conjunction with, the main processor 121. Additionally or alternatively, the auxiliary processor 123 may be adapted to consume less power than the main processor 121, or to be specific to a specified function. The auxiliary processor 123 may be implemented as a separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, a digital pen (e.g., a stylus pen), etc.

The sound output device 155 may output sound signals to the outside of the electronic device 101. The sound output device 155 may include, for example, a speaker or a receiver. The speaker may be used for general purposes, such as playing multimedia or playing recordings, and the receiver may be used for an incoming call. According to an embodiment, the receiver may be implemented as a separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. Further, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal, serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include, for example, an HDMI connector, a USB connector, an SD card connector, an audio connector (e.g., a headphone connector), etc.

The haptic module 179 may convert an electrical signal into a mechanical stimulus (e.g., a vibration or a movement) or electrical stimulus that may be recognized by a user via his or her tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. The communication module 190 may include, for example, a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of the communication modules may communicate with the external electronic device via the first network 198 (e.g., a short-range communication network, such as BLUETOOTH™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device 104) of the electronic device 101. The antenna module 197 may include an antenna including a radiating element composed of a conductive material or a conductive pattern, formed in or on a substrate (e.g., a printed circuit board (PCB)), Further, the antenna module 197 may include a plurality of antennas. In this case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type from, the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101 may, instead of or in addition to executing the function or the service, request the one or more external electronic devices 102, 104, 108 to perform at least part of the function or the service. The one or more external electronic devices 102, 104, 108 receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Hereinafter, a detailed description is provided of an electronic device that automatically changes the locked state of the electronic device to an unlocked state in a trusted location, and an operation method of the electronic device. Also, in the description, an area, which is previously designated by a user as a trusted location, is described as a first area, and an area close to the first area is described as a second area. Also, in the description, a function that automatically unlocks a locked state only in a first location area that is designated in a designated place (e.g., location or space) in the state in which the electronic device is locked so as to prevent at least some functions from being exposed to the outside, is described as an automatic unlocking function (or service). For example, a locked state may refer to a state in which a user must enter a password or some form of authentication to access a home screen and/or at least some functions of the electronic device. Meanwhile, by way of example, an unlocked state may refer to a state in which a user need not enter a password or some form of authentication where such authentication would otherwise be required in the locked state.

With reference to attached drawings, an electronic device 100 according to various embodiments is described.

Figure 2:
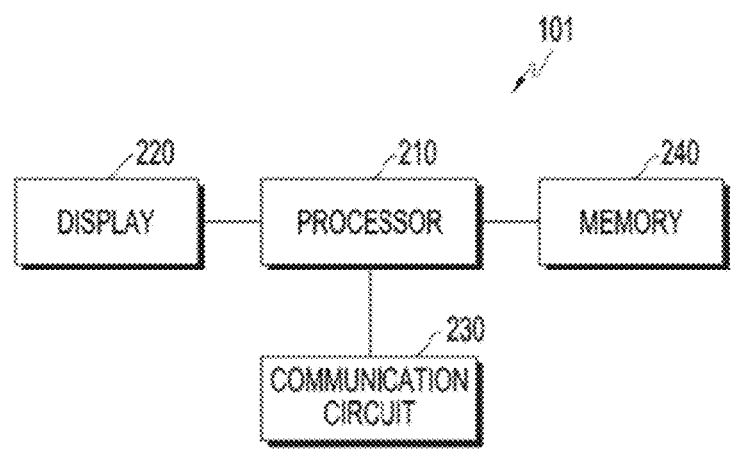
FIG. 2 is a diagram illustrating an example of the configuration of an electronic device according to an embodiment.
Figure 3:
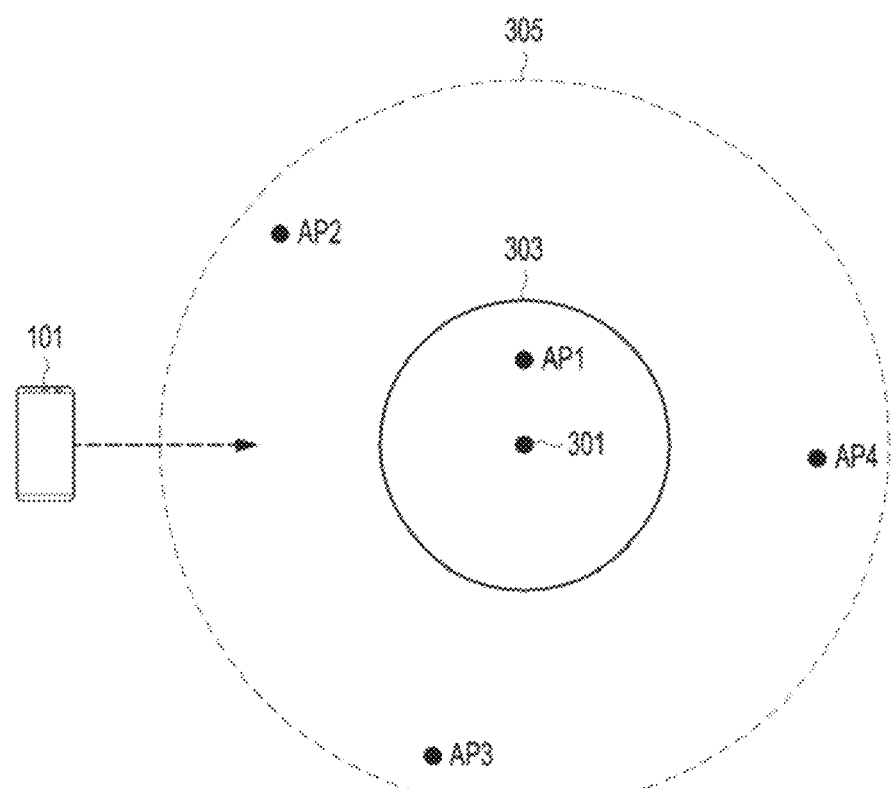
FIG. 3 is a diagram illustrating an example of a location area for a location-based operation by an electronic device according to an embodiment.

FIG. 2 is a diagram illustrating an example of the configuration of an electronic device 101 according to an embodiment. FIG. 3 is a diagram illustrating an example of a location area for a location-based operation by an electronic device 101 according to an embodiment.

Referring to FIGS. 2 and 3, the electronic device 101 (e.g., similar to or same as the electronic device 101 of FIG. 1) according to an embodiment may include a processor 210, a display 220, a communication circuit 230, and a memory 240. The processor 210 may be operatively or electrically connected to the display 220, the communication circuit 230, and the memory 240.

The processor 210 may be configured to automatically change the state of the electronic device 101 to an unlocked state or to a locked state based on the location of the electronic device 101 or the location of a user who carries the electronic device 101. If the electronic device 101 or the user who carries the electronic device 101 enters a trusted location (e.g., a first location area 303 of FIG. 3), the processor 210 may perform an automatic unlocking function so that the locked state of the electronic device 101 is changed automatically to the unlocked state. If the electronic device 101 or the user who carries the electronic device 101 is outside the trusted location, the processor 210 may perform an automatic locking function so that the unlocked state of the electronic device 101 is automatically changed to the locked state.

Before executing the automatic unlocking function, the processor 210 may set functions or information for (e.g., required for) executing the automatic unlocking function, in advance, based on a place selected by the user or situation information. For example, the processor 210 may designate, in advance, the first location area 303 that indicates a trusted location for changing the state to the unlocked state. Further, the processor 210 may designate, in advance, a second location area 305 that indicates an area adjacent to the first location area 303 (e.g., encompass and include the first location area 303) and exists within a predetermined distance from the first location area 303. The processor 210 may provide a user interface for previously designating the first location area 303 and the second location area 305, and may display (i.e., control to display) an object corresponding to the user interface on the display 220.

Before performing the automatic unlocking function, the processor 210 may be configured to collect first signal strength information related to the strength of at least one access point (AP) signal detected in the first location area 303 during a predetermined period of time, and to store the collected first signal strength information in the memory 240. The first signal strength information is information used for identifying whether the electronic device 101 is located within the first location area 303, and is used for comparison with second signal strength information included in second communication information. According to one or more embodiments, to designate the first location area 303 in advance, the processor 210 may perform control so as to display, on the display, a first object for selecting a function of automatically changing the state to the unlocked state, and a second object indicating at least one place. In response to selecting the second object on the display, the processor 210 may perform control so as to display, on the display, pieces of distance information associated with a place indicated by the second object. The processor 210 may designate the first location area based on the selected distance information, in response to a selection of one of the pieces of distance information.

The processor 210 may identify a first location of the electronic device 101 based on first communication information. If the identified first location is identified as being included in the second location area 305 adjacent to the previously designated first location area 303, the processor 210 may obtain second communication information and may identify a second location of the electronic device 101 based on at least a part of the obtained second communication information. If the second location of the electronic device 101 is identified as being included in the first location area 303, the processor 210 may change the locked state of the electronic device 101 to the unlocked state. The processor 210 may automatically change the operation state of the electronic device 101 to the unlocked state without an operation by a user. The first communication information is information that is obtained before the electronic device 101 enters the second location area 305 or the first location is identified and may include global positioning system (GPS) information obtained using a first communication scheme (e.g., a GPS communication scheme) and physical address information (e.g., media access control (MAC) address) of a device of a network that is obtained using a second communication scheme (e.g., a wireless communication scheme). The second communication information may include second signal strength information related to the strength of at least one access point signal detected in the first location area.

If the first location of the electronic device 101 or a user who carries the electronic device 101 is identified as being included in the second location area 305 adjacent to the first location area 303, the processor 210 may obtain an access point signal that is received from one or more access points in order to obtain the second communication information. The processor 210 may identify the strength of the obtained access point signal, and may obtain second signal strength information related to the identified signal strength. The processor 210 may obtain the second signal strength information at designated time intervals (e.g., intervals of one minute). In order to reduce the amount of charge consumed in the battery (e.g., the battery 189 of FIG. 1) of the electronic device 101 in the unlocked state, the processor 210 may suspend obtaining the second signal strength information when a predetermined event occurs, that is, when the state is changed to the unlocked state or when a predetermined period of time elapses after the state is changed to the unlocked state.

The processor 210 may suspend an operation of obtaining the second communication information, in response to changing the state to the unlocked state in the first location area 303. If a movement of the electronic device 101 is not detected during a predetermined period of time using at least one sensor of the electronic device 101 in the unlocked state, the processor 210 may suspend an operation of obtaining the second communication information.

If obtaining the second communication information is suspended, the processor 210 may control at least one sensor of the electronic device 101 to not obtain access point signals for obtaining the second communication information, and to detect a movement of the electronic device 101. If a movement of the electronic device 101 is detected, the processor 210 may resume the operation of obtaining the second communication information, and may identify the current location (e.g., a third location) of the electronic device 101 based on the obtained second communication information at the current point in time. If the third location of the electronic device 101 is identified as being outside the first location area 303, the processor 210 may change the unlocked state of the electronic device 101 to the locked state.

The processor 210 may detect a movement of the electronic device 101 using at least one sensor of the electronic device 101 in the unlocked state in the first location area 303. The processor 210 may identify behavior information (e.g., walking) of a user and a movement distance (e.g., a movement distance calculated based on the number of steps) from the first location area 303, based on situation information of the user (e.g., the number of steps, a gesture, Internet of Things (IoT) information, wearable device information, etc.), in response to detecting the movement of the electronic device 101. If the identified movement distance is greater than or equal to a designated distance, the processor 210 may resume obtaining the second communication information and may identify a third location of the electronic device 101 based on the second communication information obtained again. If the third location of the electronic device 101 is identified as being outside the first location area 303, the processor 210 may return the unlocked state of the electronic device 101 to the locked state. In the process in which the processor 210 identifies the third location of the electronic device 101 based on the second communication information obtained again, the processor 210 may obtain a similarity value between the second signal strength information obtained in the third location and previously stored first signal strength information and may identify that the third location is outside the first location area 303, if the similarity value is greater than a designated similarity threshold value. Since the location of the electronic device 101 is identified as being outside the first location area 303, the processor 210 may return the unlocked state to the locked state. If a user who wears a wearable device is identified as being at least a predetermined distance distant from the electronic device 101, based on the situation information, the processor 210 may automatically change the unlocked state to the locked state.

The processor 210 may obtain at least one access point signal in the first location to identify the second location of the electronic device 101 based on the second communication information. The processor 210 may obtain second signal strength information related to the strength of the obtained at least one access point signal at designated time intervals. The processor 210 may determine a similarity by comparing the obtained second signal strength information and previously stored first signal strength information and may obtain a similarity value by determining the similarity. If the similarity value is less than or equal to (or less than) a designated (e.g., predetermined) similarity threshold value, the processor 210 may identify that the location of the electronic device 101 is included in the first location area 303. Further, if the similarity value is greater than (or greater than or equal to) the similarity threshold value, the processor 210 may identify that the location of the electronic device 101 is outside the first location area 303. If the similarity value is greater than or equal to the similarity threshold value in the state in which a movement of the electronic device 101 is not detected since a previous time interval, the processor 210 may understand that a change occurs temporarily in the strength of an access point signal and may maintain the unlocked state as it is.

The processor 210 may detect a movement of the electronic device 101 using at least one sensor of the electronic device 101 in the unlocked state in the first location area 303. In response to the detection of the movement of the electronic device 101, the processor 210 may obtain a movement distance value of the electronic device 101 based on second signal strength information obtained at the current point in time. If the obtained movement distance value is greater than or equal to (or greater than) a designated (e.g., predetermined) distance threshold value, the processor 210 may return the unlocked state of the electronic device 101 to the locked state. The processor 210 may use the central point of the first location area 303 having a radius of a predetermined distance as a reference point 301 and may previously designate the distance from the reference point 301 to a designated discrimination point as the distance threshold value. Further, the electronic device 101 may control the display 220 to display a user interface via which a user is capable of designating or controlling the discrimination point, on the display. The processor 210 may previously designate a value, which is obtained by multiplying a mean value of the strength of signals, collected during a predetermined period of time (e.g., one minute) at the reference point 301, by a predetermined value, as the distance threshold value.

The processor 210 may control the display 220 so as to display notification information for indicating that the state is changed to the unlocked state or to the locked state.

The processor 210 (e.g., at least one processor) is a hardware module or a software module (e.g., an application program) and may be a hardware component (function) or a software element (program) including at least one of the various sensors of the electronic device 101, a data measurement module, an input/output interface, a module of managing the state or environment of the electronic device 101, or a communication module. The processor 210 may include, for example, one, or a combination of two or more, from among hardware, software, and firmware. Moreover, the processor 210 may be configured by omitting at least some of the components or by further including other components for performing an image processing operation, in addition to the above-described components.

The display 220 (e.g., the same as or similar to the display device 160 of FIG. 1) may display information related to an application or a program for performing the unlocking function, according to the control of the processor 210. The display 220 may display, on the display, objects corresponding to a user interface and information provided for previously setting functions or information to (e.g., required to) perform an automatic unlocking function based on a place or situation information selected by a user, before the automatic unlocking function is performed, according to the control of the processor 210.

The display 220 is an input interface that may be implemented in the form of a touch screen capable of sensing a touch when a user performs a touch motion and may display various information generated as the user performs a touch motion. The display 220 may output information associated with a result obtained by performing an operation (e.g., at least one of text, an image, or video) according to the control of the processor 210. The display 220 may display an input pad (e.g., a button) via which at least one of various characters, numbers, or symbols is input to an input window on a screen using one of the various methods. Also, the display 220 may display a service execution screen associated with execution of one of the various applications related to information transmission/reception. The display 220 may include at least one of a liquid crystal display (LCD), a thin film transistor LCD (TFT-LCD), organic light emitting diodes (OLED), a light emitting diode (LED), an active matrix organic LED (AMOLED), a flexible display, and a three-dimensional display. Some of the displays may be implemented in a transparent type or a light transmission type so that the outside can be seen therethrough. The display may be implemented in a transparent display form including a transparent OLED (TOLED). Also, according to various embodiments, the electronic device 101 may further include another display device (e.g., an extended display unit or a flexible display unit) provided in addition to the display 220, and a display device of another external electronic device (e.g., at least one of an external display device, a wearable device, or an external terminal device) that interoperates with the electronic device 101.

The communication circuit 230 may include a first communication module capable of receiving a GPS signal using a first communication scheme and may include a second communication module capable of implementing wireless communication using a second communication scheme. The communication circuit 230 may receive access point signals from access points located in an adjacent area of the electronic device 101 using the second communication scheme or the third communication scheme different from the first communication scheme.

The memory 240 may store programs or instructions for performing the location-based automatic unlocking function. The memory 240 may store programs or instructions for previously setting information or functions related to performing the automatic unlocking function, before performing the automatic unlocking function. The memory 240 may store first communication information (e.g., GPS information and/or network information) obtained using the first communication scheme and/or the second communication scheme. The memory 240 may store second communication information (e.g., second signal strength information related to the signal strength of an AP signal) obtained based on a radio communication signal received using the second communication scheme and/or the third communication scheme. The memory 240 may store information associated with the predetermined first location area 303 and the second location area 305, and may store first signal strength information obtained in the predetermined first location area 303. The memory 240 may store movement information of the electronic device 101 or the movement information of the user that is obtained using at least one sensor of the electronic device 101. The memory 240 may store situation information obtained when the electronic device 101 is located in the first location area 303.

The memory 240 (e.g., the memory 130 of FIG. 1) may store a program (e.g., the program 140 of FIG. 1) for (e.g., required for) performing a function according to various embodiments and various data generated while the programs are executed. The memory 240 may include a program area and a data area. The program area may store program information related to operating the electronic device 101, such as an operating system (OS) (e.g., the operating system 142 of FIG. 1) that boots up the electronic device 101. The data area may store transmitted and/or received data and generated data. Also, the memory 240 may include at least one storage medium from among flash memory, hard disk, multimedia card micro type memory (e.g., secure digital (SD) or extreme digital (XD) memory), RAM, and ROM.

The electronic device 101 may further include an input interface, an output interface, and a sensor module including at least one sensor.

It is understood that, in various embodiments, the electronic device 101 may include fewer or more components as compared to the components of FIG. 2. Also, the locations of the main components of the electronic device 101 that have been described above with reference to FIG. 2 may be changed according to various embodiments.

The operation procedure of the above-described electronic device (e.g., the electronic device 101 of FIG. 1 and the electronic device 101 of FIG. 2) is described in detail with reference to attached drawings.

Figure 4:
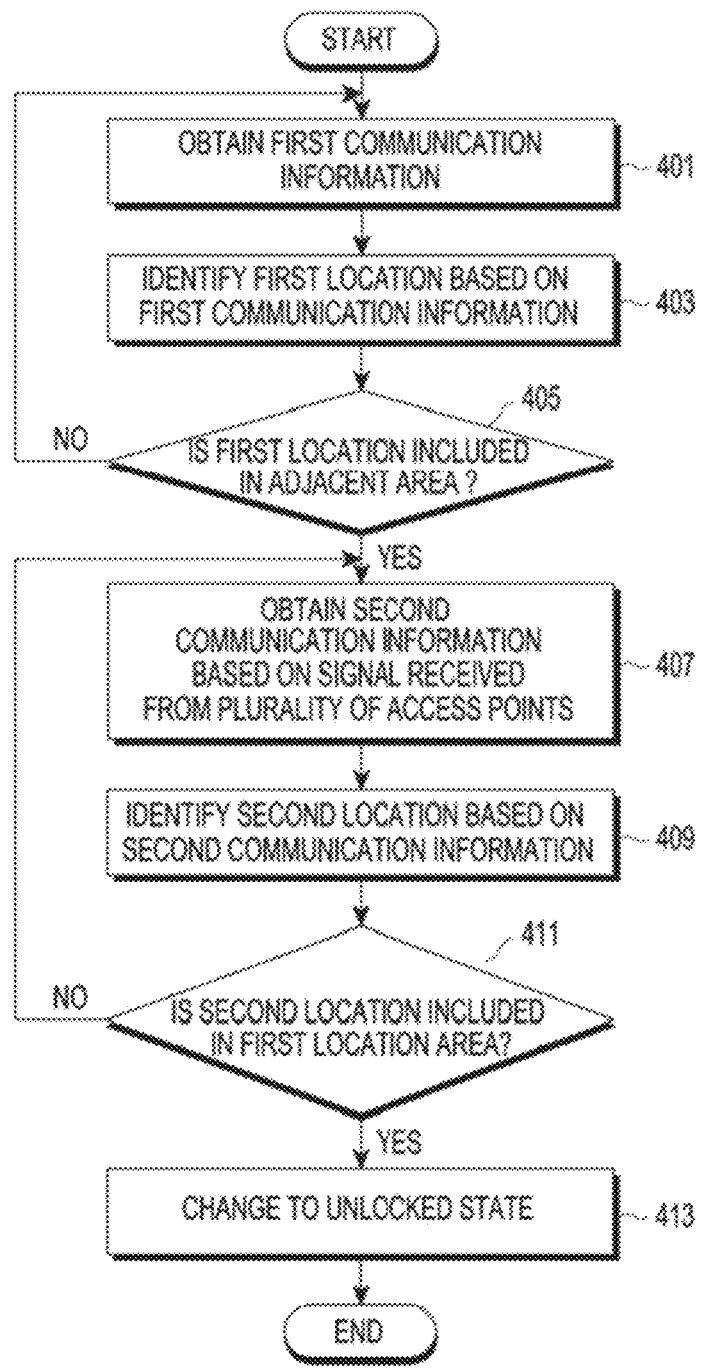
FIG. 4 is a flowchart illustrating an example of a location-based operation procedure by an electronic device according to an embodiment.

FIG. 4 is a flowchart illustrating an example of a location-based operation procedure by an electronic device according to an embodiment.

Referring to FIG. 4, the electronic device may obtain first communication information in operation 401 and may identify a first location based on the obtained first communication information in operation 403. The first communication information may include at least one of global positioning system (GPS) information obtained using a first communication scheme and physical address information of a device of a network that is obtained using a second communication scheme.

In operation 405, the electronic device may identify whether the identified first location (e.g., current location) is in an adjacent area (e.g., the second location area 305 of FIG. 3) of a previously designated first location area (e.g., the first location area 303 of FIG. 3). According to the result of the identification, if the identified first location is identified as being in the adjacent area, the electronic device may perform operation 407. If the identified current location is identified as not being in the adjacent area, the electronic device may perform operation 401 again. If a similarity between the first communication information and predetermined location information associated with a second location area is high (e.g., the matching rate is more than a predetermined value, such as 80%), the electronic device may identify that the first location is located in the second>location area.

In operation 407, the electronic device may detect an access point signal transmitted from at least one access point, and may obtain second communication information including second signal strength information related to the strength of the detected access point signal. The electronic device may obtain second communication information during a predetermined period of time (e.g., one minute) at predetermined collection time (t) intervals (e.g., intervals of 2 minutes). The electronic device may identify an accurate location in a space smaller than a space that allows the electronic device to identify a location using the first communication information.

In operation 409, the electronic device may identify a second location based on the obtained second communication information.

In operation 411, the electronic device identifies whether the second location is within the first location area based on the second communication information, in order to identify the accurate location. According to the result of the identification, if the second location is identified as being within the first location area, the electronic device may perform operation 413. If the second location is identified as not being within the first location area, the electronic device may perform operation 407 again. In operation 413, the electronic device may automatically change a locked state to an unlocked state without an operation by a user. If the electronic device 101 changes to the unlocked state in the first location area, the electronic device 101 may suspend an operation of obtaining the second communication information so as not to obtain the second communication information. Further, if the electronic device changes to the unlocked state in the first location area, the electronic device 101 may obtain the second communication information at time intervals, each time interval being longer than the predetermined time interval. If a movement of the electronic device or a user is detected, the electronic device 101 may resume obtaining the second communication information at the predetermined time intervals.

Figure 5A:
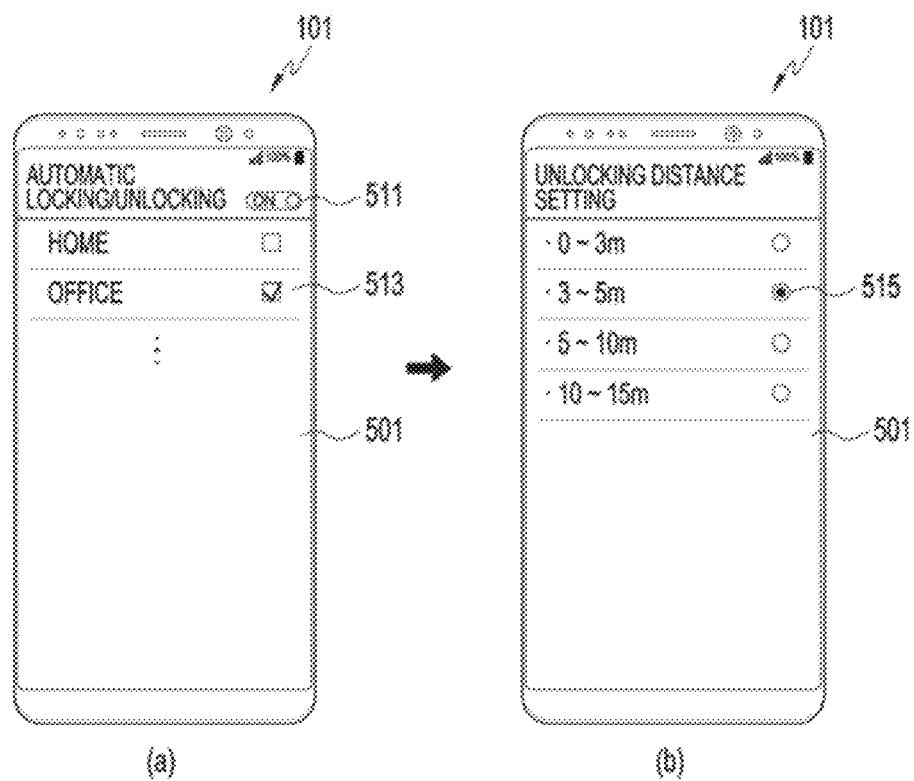
FIGS. 5A and 5B are diagrams illustrating examples of a screen of an electronic device according to various embodiments.
Figure 5B:
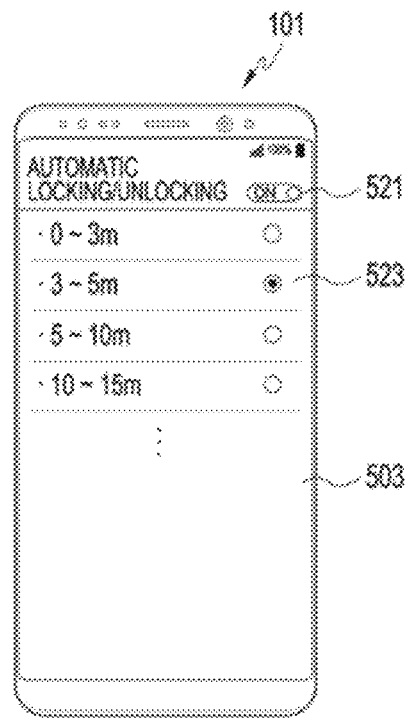

FIGS. 5A and 5B are diagrams illustrating examples of a screen of an electronic device according to various embodiments.

The electronic device 101 (e.g., the first electronic device 101 of FIG. 1 or the electronic device 101 of FIG. 2) according to various embodiments may previously set pieces of information related to the automatic unlocking function, before executing a software program or an application that provides the automatic unlocking function (or service), as described with reference to the operations of FIG. 4.

Referring to FIG. 5A, the electronic device 101 may display an object 511 for setting whether to perform automatic locking or unlocking, and an object 513 for setting a place for unlocking (e.g., home, office, or the like), on a screen 501 of a display (e.g., the display 220 of FIG. 2), in response to a request for previously setting information related to the automatic unlocking function. The electronic device 101 may further display an object 515 for setting an additional function on the screen 501. The objects 511, 513, or 515 displayed on the display 501 may be displayed in the form of an image or text that allows user interfacing. The electronic device 101 may display, on the screen 501, objects 515 (e.g., 0~5 m, 5~10 m, 10~15 m, or 15~20 m) corresponding to distance information in the process of selecting at least one of places indicated by the object 513 on the screen 501. The distance information may indicate radiuses for setting a first location area that is a trusted location within which the electronic device is allowed to automatically change to an unlocked state in a selected place. The electronic device 101 may display the objects 515 for setting the first location area on a popup window or another changed screen. The electronic device 101 may display the objects 515 on the screen 503 in the form of an image or text that allows user interfacing.

The electronic device 101 may designate a radius (e.g., 0~5 m) corresponding to the object selected from among the objects 515 as a first location area and may store, in the memory, first signal strength information obtained based on access point signals detected within the set first location area. The electronic device 101 may receive access point signals within the first location area (e.g., 0~5 m) during a predetermined period of time (e.g., one minute) at regular intervals, for example, at intervals of one second, and may analyze the signal strength of each of the received access point signals, so as to obtain a mean value (μ) of signal strength of the access point signals for each access point or a covariance value of signal strength of the access point signals for each access point. The electronic device 101 may set first signal strength information corresponding to the obtained mean value (μ) or covariance value. The first signal strength information may be set by applying a weight to an access point signal having a high signal strength.

Referring to FIG. 5B, the electronic device 101 may display, on the screen 501 of the display (e.g., the display 220 of FIG. 2), an object 521 for setting whether to perform automatic locking or unlocking, and objects 523 (e.g., 0~5 m, 5~0 m, 10~15 m, or 15~20 m) indicating radiuses for setting a first location area within which the electronic device is allowed to automatically change to the unlocked state in a selected place. The electronic device 101 may display the objects 521 and 523 without displaying the object 513 for selecting a place where the automatic locking/ unlocking service is to be provided as shown in the left diagram of FIG. 5A. For example, the electronic device 101 may learn an unlocking pattern of a user, and may set at least one place for providing a locking/unlocking service based on learning result information without selection by the user.

Figure 6:
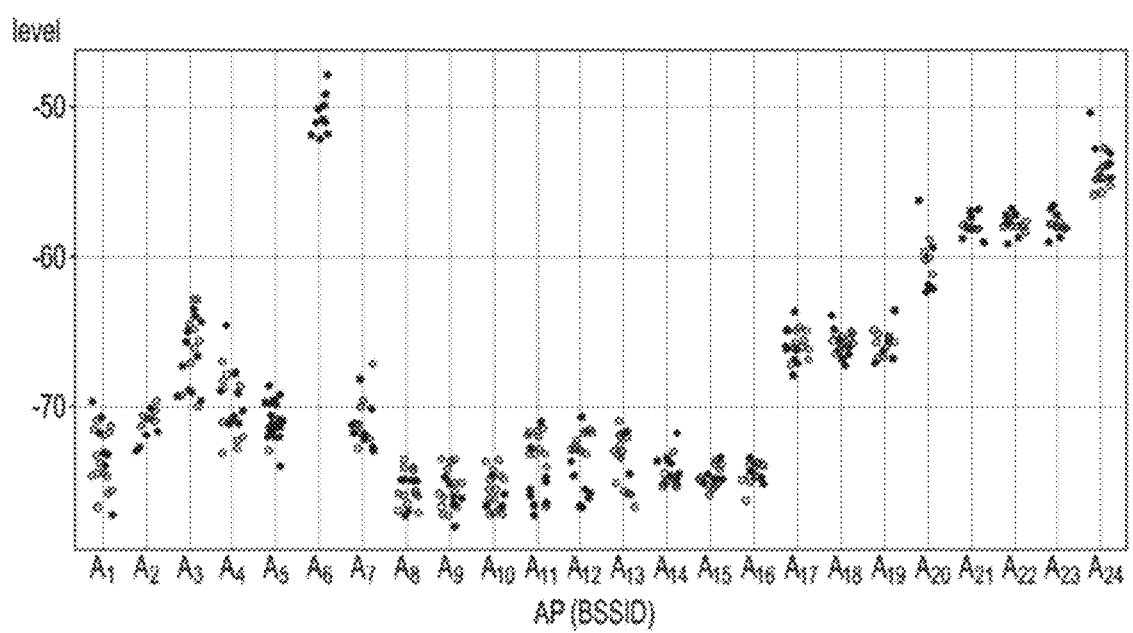
FIG. 6 is a diagram illustrating an example of an operation by an electronic device according to an embodiment.

FIG. 6 is a diagram illustrating an example of an operation by an electronic device according to various embodiments, FIGS. 7A to 7C are diagrams illustrating examples of an operation by an electronic device, according to various embodiments.

Referring to FIG. 6, an electronic device (e.g., the first electronic device 101 of FIG. 1 or the electronic device 101 of FIG. 2) may periodically collect an access point signal during a predetermined period of time (e.g., one minute) in the first location area 303, in the process of previously setting pieces of information related to an automatic unlocking function. The electronic device may calculate the mean value (μ) of signal strength of access point signals collected at least ten times from among collected signals, and may store the signal strength mean value (μ) in the memory as first signal strength information. The signal strength mean value (μ) may be expressed as a vector. For example, if 20 AP signals are collected, this may be expressed as a 20-dimensional vector. As illustrated in FIG. 6, the electronic device 101 may estimate a covariant matrix of access points, based on the periodically stored signal strength mean values (μ).

Before executing the location-based automatic unlocking function, the electronic device may collect signals transmitted from each of a plurality of access points (AP1, AP2, AP3, AP4, and AP5) during a predetermined period of time (e.g., one minute) at collection time intervals (t) (e.g., 2 seconds) as illustrated in the table of FIG. 7A, and may calculate the signal strength mean value (μ) of signals collected from each access point for each access point (e.g., −65 for AP1, −50 for AP2, −62 for AP3, −80 for AP4, and −75 for AP5). The electronic device may store in advance, in the memory, the first signal strength information including the calculated signal strength mean value for each access point.

In the process of performing the location-based automatic unlocking function, the electronic device may collect a signal strength vector ($x_t$) of an access point signal at a collection time point (t) as illustrated in FIG. 7B.

As illustrated in the table of FIG. 7B, the electronic device 101 may identify that the identified signal strength of a first access point (AP1) at a first time point (00:01) is −80, the identified signal strength of a second access point (AP2) is −40, the identified signal strength of a fourth access point (AP4) is −75, and the identified signal strength of a fifth access point (AP5) at a second time point (00:02) is −82. Accordingly, as illustrated in FIG. 7C, the electronic device 101 may set the identified signal strength values as signal strength vector values ($x_t$). As illustrated in the table of FIG. 7C, the signal strength vector values ($x_t$) from a first time point (t=1) to a fifth time point (t=5) may be set for each access point. The collection interval is longer than a collection interval for collection by an access point (AP) scan operation in WiFi communication. Accordingly, an AP signal that is collected once may be maintained at the signal strength mean value of previously collected signals until collection resumes (e.g., 5 seconds). For example, as illustrated in the table of FIG. 7C, if the signal strength of an AP2 signal is not detected from among signal strength vector values ($x_2$) of a second time point, the electronic device may maintain a value of −40, which is the signal strength value at the first time point.

As illustrated in the table of FIG. 7C, the electronic device may compare the signal strength vector values ($x_t$) set for each time point (e.g., the first time point ($t=x_1$) to the fifth time point ($t=x_5$)) and signal strength mean values ($\mu$) of FIG. 7A, so as to calculate a similarity value (score). For example, if it is identified that a predetermined similarity threshold value (e.g., 6) is a value between the similarity value (7.44) of the third time point ($t=x_3$) and the similarity value (4.88) of the fourth time point ($t=x_4$) in the table of FIG. 7C, it is identified that the electronic device enters a first location area between the third time point and the fourth time point.

The similarity value may be calculated using Equation 1 or Equation 2, provided below. If the similarity value is a value, which is close to 0 and is less than or equal to a predetermined similarity threshold value (e.g., 6), it is identified that the electronic device is located within the first location area.

Equation 1 is the Euclidean distance calculation method, and is a formula that calculates the distance between two points in an n-dimensional space.

$$\sqrt{(x_t-\mu)'(x_t-\mu)/N} \qquad \text{[Equation 1]}$$

Equation 2 is the Mahalanobis distance calculation method and is a formula that calculates the distance between two populations having different mean values. The distance obtained based on Equation 2 may be calculated by applying the correlation of access points that is calculated by Equation 3.

$$\sqrt{(x_t - \mu)'S^{-1}(x_t - \mu)/N} \qquad \text{[Equation 2]}$$

$$S(i, j) = \frac{\sum_{k=1}^{n}(x_{ki} - \bar{x}_i)(x_{kj} - \bar{x}_j)}{n-1} \qquad \text{[Equation 3]}$$

In the equations, S denotes an estimated value of a covariance matrix of access points (APs). An element at (i, j) in matrix S indicates the correlation between an $i^{th}$ AP and an $j^{th}$ AP. Here, $x_{ki}$ denotes the signal strength of the $i^{th}$ AP collected at a timepoint k. $\bar{x}_i$ denotes the signal strength mean value of signals of the $i^{th}$ AP collected during a period of time corresponding to K=1~n (e.g., one minute). $x_{kj}$ denotes the signal strength of the $j^{th}$ AP collected at a timepoint k. $\bar{x}_j$ denotes the signal strength mean value of signals of the $j^{th}$ AP collected during a period of time corresponding to K=1~n (e.g., one minute). N denotes the number of APs, and n denotes the number of signal vectors used for calculating correlation. The distance calculated by the above-mentioned equations, that is, a similarity value, may be obtained by applying a weight associated with signal strength. As the signal strength is higher, it is considered that the electronic device is closer to the first location area. Accordingly, a larger weight may be applied when the distance is calculated.

Figures 8A, 8B, 8C:
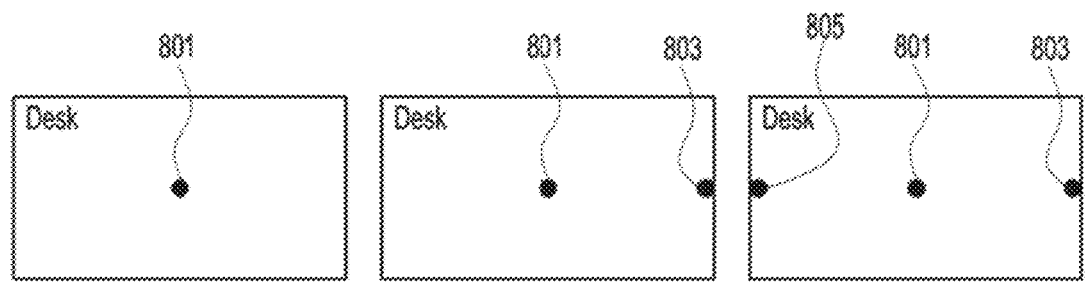
FIGS. 8A to 8C are diagrams illustrating an example of an operation by an electronic device according to an embodiment.

FIGS. 8A to 8C are diagrams illustrating examples of an operation by an electronic device according to various embodiments.

Referring to FIGS. 8A, 8B, and 8C, an electronic device according to various embodiments may set a similarity threshold value corresponding to a discrimination point for determining whether to change a state to a locked state or an unlocked state based on one or two or more locations in a first location area.

As illustrated in FIG. 8A, the electronic device may collect first signal strength information related to signal strength of access point signals during, one minute at a first center point 801 (e.g., the reference point 301 of FIG. 3) and may calculate a signal strength mean value ($\mu$), which is a mean vector, based on the collected first signal strength information. When the electronic device 101 periodically collects an access point signal, the electronic device 101 may calculate the signal strength vector ($x_t$) of the collected signals and may obtain second signal strength information. The electronic device may calculate the distance between the signal strength mean value ($\mu$) and the signal strength vector value ($x_t$) and may calculate a similarity threshold value by multiplying the mean value of the calculated distances by a predetermined value (e.g., a magic number). According to various embodiments, the electronic device may provide a user interface related to an object for designating a discrimination point and the center point 801 so that the discrimination point corresponding to the similarity threshold value is designated via a display. Further, in the process of previously designating the first location area (e.g., an area where a desk of an office is located), the electronic device may provide a user interface for designating the discrimination point, may designate the discriminating point, and may previously designate a similarity threshold value corresponding to the designated discriminating point. If distance information is selected as illustrated in the right diagram of FIG. 5A or FIG. 5B, the electronic device may display a first location area having a radius corresponding to the selected distance information on the display, may display the center point 801 (e.g., same as or similar to the reference point 301 of FIG. 3) in the first location area, and may display an object for designating the discriminating point adjacent to the displayed first location area. According to various embodiments, the electronic device may designate the similarity threshold value when the electronic device performs a location-based unlocking function and identifies a second location of the electronic device. Moreover, the electronic device may update a previously stored similarity threshold value with the designated similarity threshold value when the electronic device completes execution of the unlocking function, and when the electronic device identifies the second location.

As illustrated in FIGS. 8B and 8C, the electronic device may calculate the distance between the first center point 801 (e.g., the reference point 301 of FIG. 3) and a boundary point 803 or 805 that is located a predetermined distance distant from the first center point 801, and may designate a discrimination point corresponding to a similarity threshold value. The electronic device collects signal strengths of access point signals, for example, during one minute at the center point 801, may calculate the mean value ($\mu$) of the collected signal strengths, may periodically calculate a signal strength vector value during a period of time during which signal strength is collected at the boundary point 803 or 805, and may calculate the distance between the calculated mean value and the signal strength vector value, so as to designate a discrimination point corresponding to the similarity threshold value.

Figure 9:
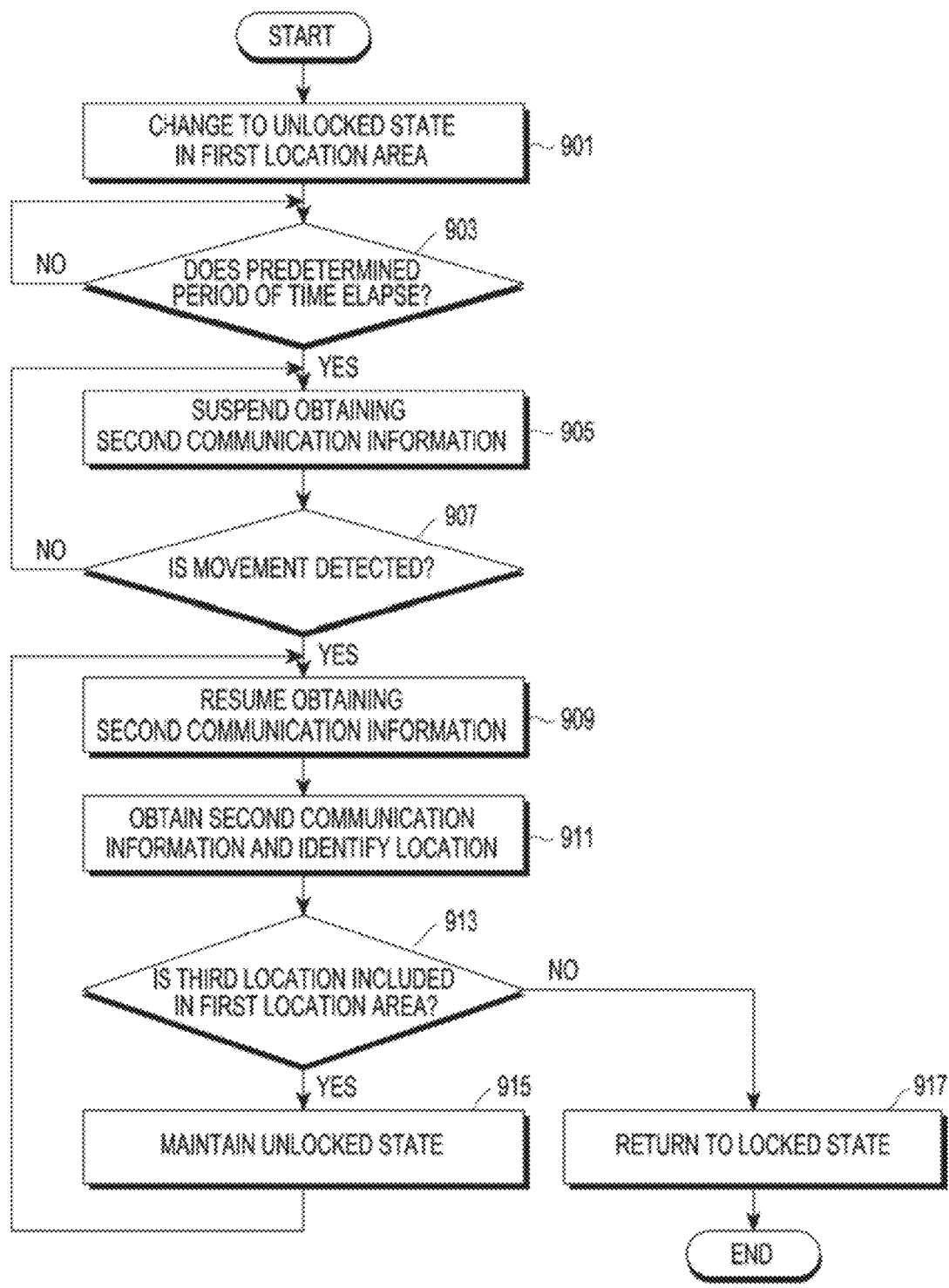
FIG. 9 is a flowchart illustrating an example of a location-based operation procedure by an electronic device according to an embodiment.

FIG. 9 is a flowchart illustrating an example of a location-based operation procedure by an electronic device according to an embodiment.

Referring to FIG. 9, an electronic device may change to an unlocked state in a first location area by the operations of FIG. 4, in operation 901.

In operation 903, the electronic device may identify whether a predetermined period of time (e.g., 3 minutes)

elapses. According to the result of the identification, if the predetermined period of time elapses, the electronic device proceeds with operation 905. If the predetermined period of time does not elapse, the electronic device maintains the unlocked state and proceeds with operation 901 again.

In operation 905, the electronic device may suspend an operation of obtaining second communication information.

In operation 907, the electronic device identifies whether a movement is detected using at least one sensor (e.g., an accelerator sensor or a gyro sensor). According to the result of the identification, if a movement is detected, the electronic device proceeds with operation 909. If a movement is not detected, the electronic device proceeds with operation 905 again.

When a movement is detected, the electronic device may resume the operation of obtaining second communication information in operation 909. The second communication information may include second signal strength information related to a signal strength of an access point signal transmitted from each of access points.

In operation 911, the electronic device may identify a third location where the electronic device is currently located, based on the second communication information. The electronic device may calculate a similarity value at the current point in time using Equation 1, Equation 2, and the operation of calculating a similarity value which have been described above with reference to FIGS. 7A to 7C. The electronic device compares previously stored first signal strength information and the second signal strength information included in the second communication information obtained in operation 909, so as to calculate the similarity value at the current point in time (t). The second signal strength information included in the second communication information may be collected during a predetermined period of time (e.g., one minute) at predetermined time intervals (t) (e.g., intervals of two seconds).

In operation 913, the electronic device may identify whether the identified third location is within the first location area. According to the result of the identification, if the identified current location is within the first location area, the electronic device maintains the unlocked state in operation 915, proceeds with operation 909 again so as to obtain second communication information at a subsequent point in time, and performs subsequent operations based on the obtained second communication information.

According to the result of the identification in operation 913, if it is identified that the identified third location is outside the first location area, the electronic device returns to the locked state from the unlocked state in operation 917. After the electronic device performs operation 917, the electronic device may terminate execution of a program or application for the unlocking function and may change to an idle state. The electronic device suspends the operation of collecting access point signals for obtaining second communication information for the unlocking function and may perform an operation of identifying the location of the electronic device by only performing an operation of obtaining first communication information. If a similarity between the obtained first communication information and predetermined location information related to a second location area is low (e.g., the matching rate is less than a predetermined value, such as 30%), the electronic device may terminate the execution of a program or application for the unlocking function, and if the similarity increases to be greater than or equal to a predetermined value (e.g., 30%), the electronic device operating in the idle state may activate the program or application for the unlocking function.

Figure 10:
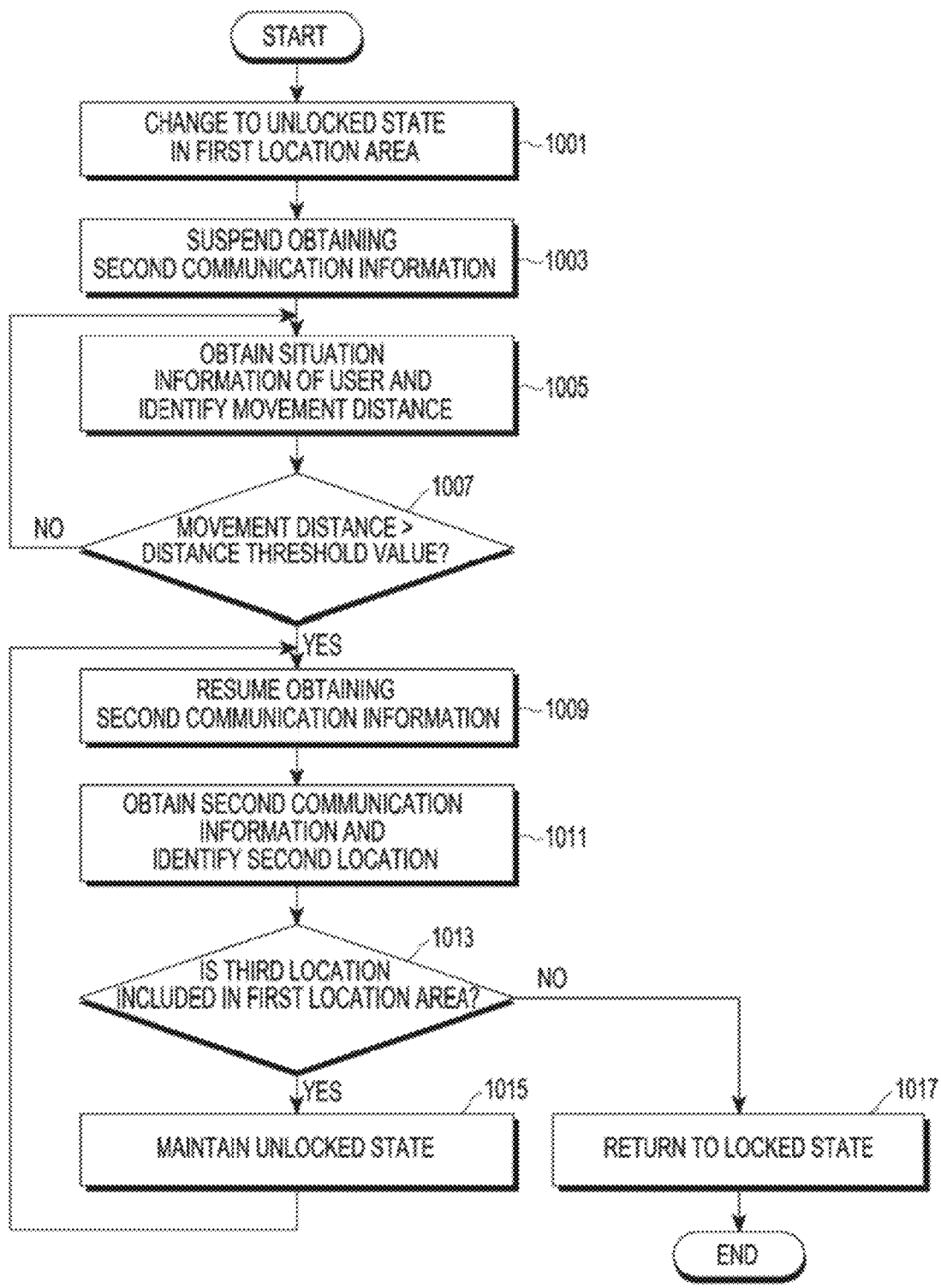
FIG. 10 is a flowchart illustrating an example of a location-based operation procedure by an electronic device according to an embodiment.

FIG. 10 is a flowchart illustrating an example of a location-based operation procedure by an electronic device according to an embodiment.

Referring to FIG. 10, an electronic device may change to an unlocked state in a first location area by the operations of FIG. 4, in operation 1001.

In operation 1003, the electronic device may suspend an operation of obtaining second communication information.

In operation 1005, the electronic device may obtain situation information (e.g., activity information) of a user and may calculate a movement distance associated with a movement of the user based on the obtained situation information.

In operation 1007, the electronic device may identify whether the movement distance of the user is beyond the first location area 203 and is greater than or equal to a threshold value indicating a predetermined distance (e.g., 4 m). According to the result of the identification, if the calculated movement distance is greater than or equal to the a threshold value, the electronic device proceeds with operation 1009. If the calculated movement distance is less than the threshold value, the electronic device proceeds with operation 1005 again.

If the calculated movement distance is identified as being greater than or equal to the predetermined distance, the electronic device may resume the operation of obtaining second communication information in operation 1009. The second communication information may include second signal strength information related to a signal strength of an access point signal transmitted from each of the access points.

In operation 1011, the electronic device may obtain the second communication information and may identify a third location where the electronic device is currently located based on the second communication information. The electronic device may calculate a similarity value at the current point in time using Equation 1, Equation 2, and the operation of calculating a similarity value that have been described above with reference to FIGS. 7A to 7C. The electronic device compares previously stored first signal strength information and the second signal strength information included in the second communication information obtained in operation 1011 so as to calculate the similarity value at the current point in time (t). The second signal strength information included in the second communication information may be collected during a predetermined period of time (e.g., one minute) at predetermined collection time intervals (t) (e.g., intervals of two seconds).

In operation 1013, the electronic device may identify whether the identified third location is within the first location area. According to the result of the identification, if the identified current location is within the first location area, the electronic device maintains the unlocked state in operation 1015, proceeds with operation 1009 again so as to obtain second communication information at a subsequent point in time, and performs subsequent operations based on the obtained second communication information.

According to the result of the identification in operation 1013, if it is identified that the identified third location is outside the first location area, the electronic device returns to the locked state from the unlocked state in operation 1017. According to various embodiments, the electronic device performs operation 1017, may terminate execution of a program or application for unlocking, and may change to an idle state. Further, the electronic device may suspend the operation of collecting access point signals for obtaining second communication information for the unlocking function and may perform an operation of identifying the location of the electronic device by only performing an operation of obtaining first communication information. If a similarity between the obtained first communication information and predetermined location information related to a second location area is low (e.g., the matching rate is less than 30%), the electronic device terminates the execution of a program or application for the unlocking function, and if the similarity increases to be greater than or equal to a predetermined value (e.g., 30%), the electronic device operating in the idle state may activate the program or application for the unlocking function.

Figure 11A:
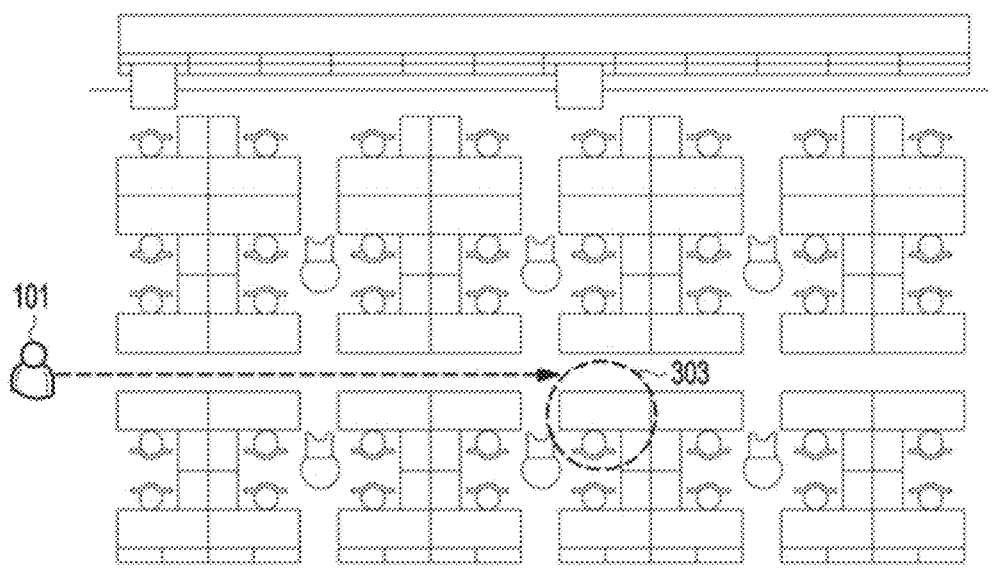
FIGS. 11A and 11B are diagrams illustrating an example of an operation by an electronic device according to an embodiment.
Figure 11B:
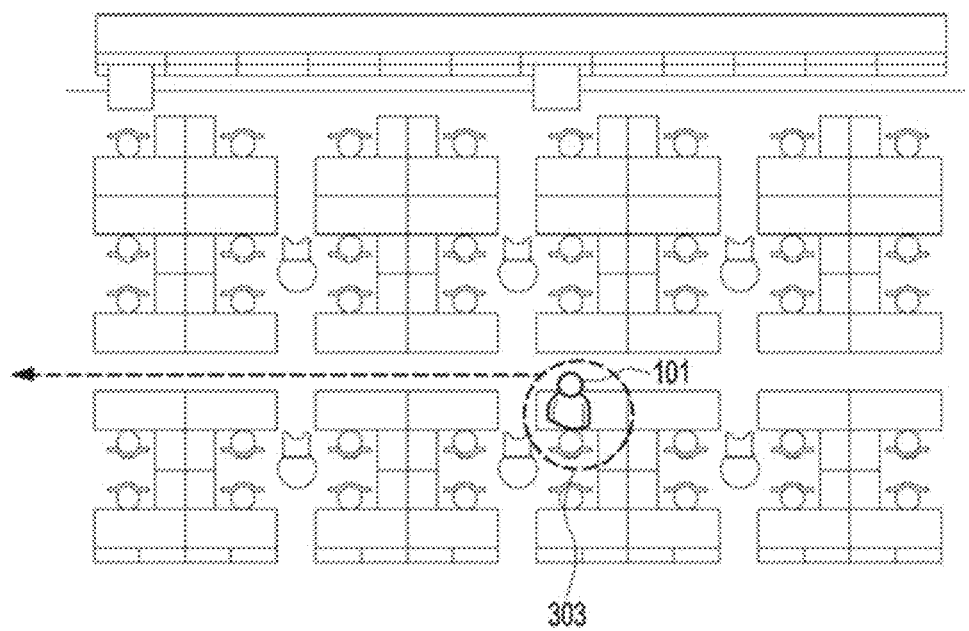

FIGS. 11A and 11B are diagrams illustrating examples of an operation by an electronic device according to an embodiment.

Referring to FIG. 11A, if the electronic device 101 enters the first location area 303 from the outside, the state of the electronic device set as a locked state may change to an unlocked state according to the operations of FIG. 4. A user of the electronic device 101 may leave the electronic device 101 on a predetermined spot of the first location area 303 (e.g., on a desk in an office) and may not use the same during a predetermined period of time. Accordingly, if the electronic device 101 enters the first location area 303, the electronic device 101 may suspend an operation of collecting second communication information in order to reduce the amount of charge of a battery consumed for periodically collecting the second communication information and may detect a movement of the electronic device using at least one sensor of the electronic device 101, as described above with reference to the operation procedures of FIGS. 9 and 10. According to the operations of FIG. 9 or 10, the electronic device may not perform the operation of obtaining the second communication information when the electronic device is in the unlocked state in the first location area. Accordingly, the electronic device may reduce the amount of charge of the battery of the electronic device consumed for periodically detecting an access point signal.

Referring to FIG. 11B, the electronic device 101 may identify whether the electronic device 101 leaves the first location area 303, according to operation 911 of FIG. 9 or operation 1011 of FIG. 10. Accordingly, if the electronic device 101 is outside the first location area 303, the electronic device 101 may return the state from the unlocked state to the locked state. The electronic device 101 according to various embodiments changes to the unlocked state only in a small space such as the first location area 303 (e.g., an area where a user's desk is located in the office) and may automatically return the state to the locked state in other locations so that the security of the user may be improved.

Figure 12A:
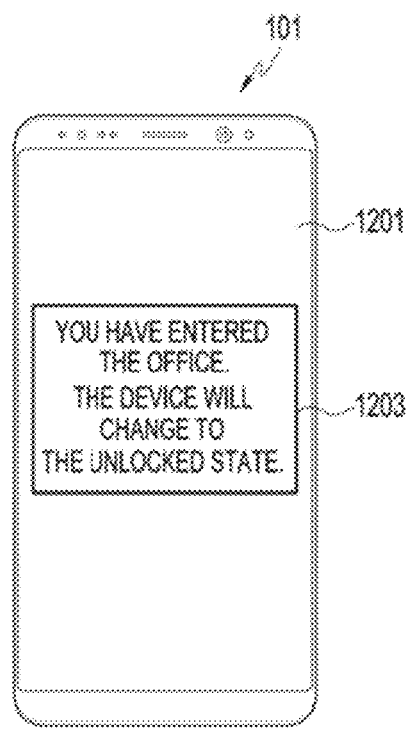
FIGS. 12A and 12B are diagrams illustrating an example of a screen in association with an operation by an electronic device according to an embodiment.
Figure 12B:
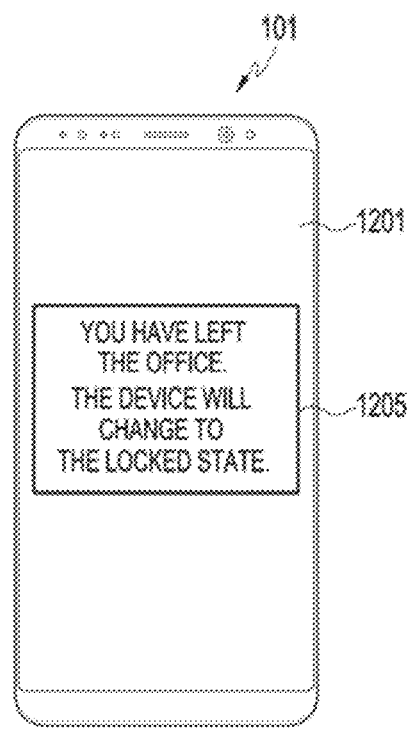

FIGS. 12A and 12B are diagrams illustrating examples of a screen, in association with an operation by an electronic device according to various embodiments.

Referring to FIGS. 12A and 12B, when (e.g., based on) an electronic device according to various embodiments changes to an unlocked state, the electronic device may display, as shown in FIG. 12A, a notification message 1203 on a display screen 1201, such as "You have entered the office. The device will change to the unlocked state." If the electronic device 101 changes from the unlocked state to the locked state, the electronic device 101 may display, as shown in FIG. 12B, a notification message 1205 on the display screen 1201, such as "You have left the office. The device will change to the locked state."

Figure 13:
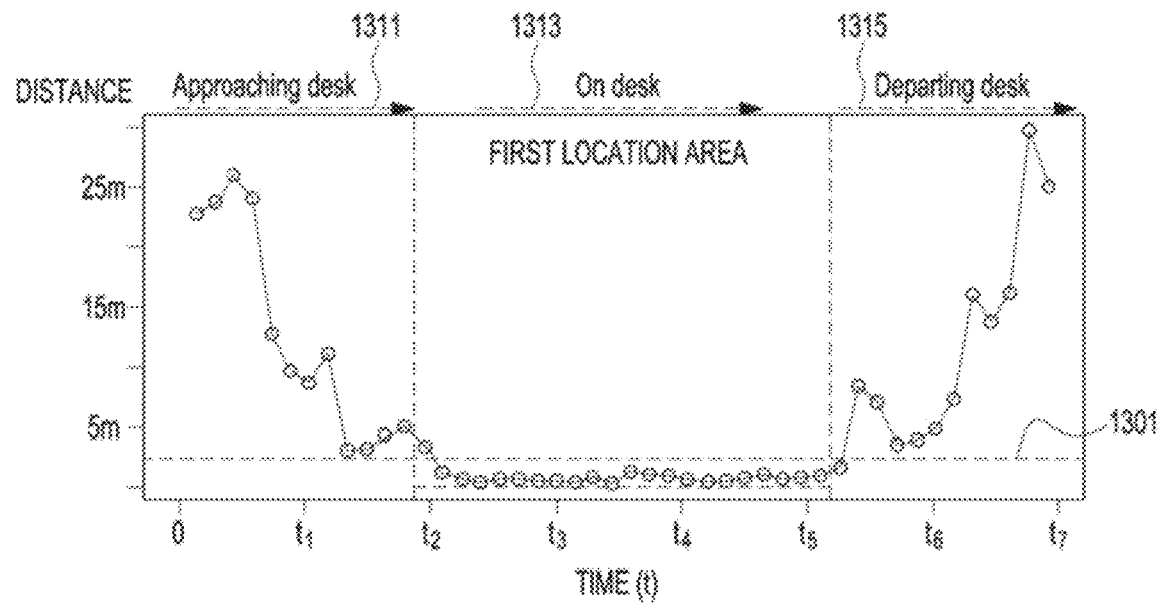
FIG. 13 is a diagram illustrating an example of an operation by an electronic device according to an embodiment.

FIG. 13 is a diagram illustrating an example of an operation by an electronic device according to an embodiment.

Referring to FIG. 13, the electronic device may identify the distance from a reference point 0 of a first location area 1313 (e.g., an area where a desk is located in the office) based on a similarity value calculated at a time point (t) for obtaining second communication information. The electronic device may identify that the electronic device is outside the first location area 1313 since the similarity values calculated at a first time point (t0) to a third time point (t2) are greater than or equal to a similarity threshold value 1301. The locations identified at the first time point (t0) to the third time point (t2) are included in an adjacent area 1311 of the first location area 1313. Since the identified distances become more similar to the distance (e.g., 3 m) corresponding to the similarity threshold value 1301, it is identified that the electronic device moves toward the first location area 1313.

If the similarity value calculated at the third time point (t2) is identified as being less than or equal to the similarity threshold value 1301, the electronic device may identify that the location at the third time point (t2) is within the first location area 1313. Accordingly, the electronic device may automatically change to the unlocked state at the third time point (t2). The electronic device may identify that the electronic device is included in the first location area 1313 since the similarity values calculated at the third time point (t2) to a fifth time point (t4) do not exceed the similarity threshold value 1301.

The electronic device may identify that the electronic device is outside the first location area 1313 since the similarity values calculated after a sixth time point (t5) are greater than or equal to the similarity threshold value 1301. The locations identified at the sixth time point (t5) to the eighth time point (t7) are included in an adjacent area 1315 of the first location area 1313. Since the identified distances become more different from the distance (e.g., 3 m) corresponding to the similarity threshold value 1301, it is identified that the electronic device moves away from the first location area 1313.

Figure 14:
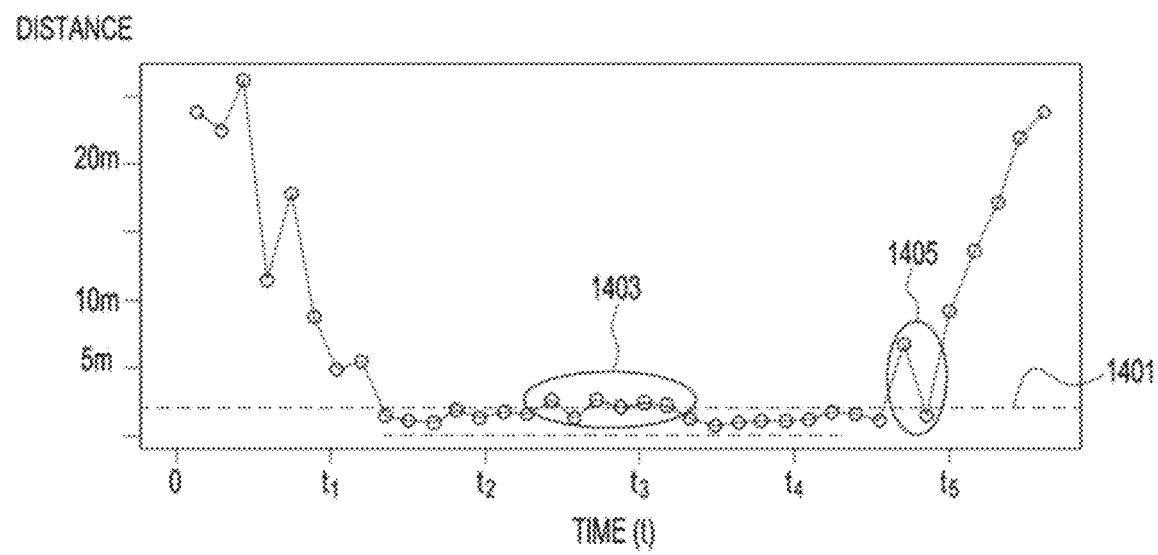
FIG. 14 is a diagram illustrating an example of an operation by an electronic device according to an embodiment.

FIG. 14 is a diagram illustrating an example of an operation by an electronic device according to an embodiment.

Referring to FIG. 14, an electronic device may identify that the electronic device is located in a first location area from a second time point (t1) to a fifth time point (t4), since the similarity values calculated at the second time point (t1) to the fifth time point (t4) are less than or equal to a similarity threshold Value 1401. The electronic device may identify a change in a movement distance based on similarity values obtained at previous time points.

The electronic device may identify that some 1403 of the similarity values calculated from the second time point (t1) to the fifth time point (t4) exceed the similarity threshold value 1401 due to a movement of the electronic device. In this instance, the electronic device may identify a change in the movement distance, based on similarity values obtained at previous time points. If the identified change in the movement distance is within a predetermined range (e.g., within 1 m), the electronic device may determine that the strength of a received signal is changed due to a movement of the electronic device at the same location. Accordingly, the electronic device may identify that the current location is included in the first location area. In the process of identifying that some 1403 of the similarity values calculated from the second time point (t1) to the fifth time point (t4) exceed the similarity threshold value 1401, due to a movement of the electronic device, the electronic device may detect a movement using at least one sensor of the electronic device. If a movement is not detected, the electronic device may determine that the electronic device is located in the same location.

According to various embodiments, it is shown that some of similarity values calculated between the fifth time point (t4) and a sixth time point (t5) exceed the similarity threshold value 1401 in an area 1405 of FIG. 14, and some of the similarity values calculated at a subsequent time point fall to be less than or equal to the similarity threshold value 1401. In this instance, the electronic device may identify a user situation (e.g., walking) and may identify that a user moves in a direction that is distant from the reference point 0, based on situation information of the user which is collected between the fifth time point (t4) and the sixth time point (t5). Although some of the calculated similarity values fall to be less than or equal to the similarity threshold value 1401, if the electronic device identifies that the electronic device is leaving the first location area, the electronic device returns the state from the unlocked state to the locked state. Further, although some of the calculated similarity values fall to be less than or equal to the threshold value 1401, if a change in the movement distance is continuously greater than or equal to a predetermined range (e.g., within 1 m), it is identified that the electronic device is leaving the first location area, and the electronic device returns the state from the unlocked state to the locked state.

According to various embodiments, the electronic device may obtain second communication information including second signal strength information related to signal strength of access point signals, as described above with reference to the operations of FIGS. 4, 9, and 10. The electronic device may update first signal strength information including a mean vector value stored in a memory based on the obtained second communication information.

The electronic device may identify the location of a user when the user moves without carrying the electronic device via communication between a wearable device that the user wears or various communication devices disposed in a first location area.

Further, the electronic device may identify whether the electronic device moves, using at least one sensor, and may identify whether a signal is received from an external electronic device such as a wearable device that the user wears, a device that the user operates, or the like. If the signal is received from the external device and a movement of the electronic device is not detected during a predetermined period of time, the electronic device determines that the user moves distant, from the electronic device, and may identify the location of the user based on the signal received from the external device. The electronic device may identify the distance to a reference point of the first location area where the identified location of the user is designated, may determine that the electronic device is outside the first location area if the identified distance is greater than or equal to a determined distance, and may automatically change the unlocked state of the electronic device to the locked state.

According to various embodiments, if an external device such as a wearable device that the user wears or the like is capable of detecting an access point signal, the external device may collect second communication information including information related to the signal strength of an access point signal and may transmit the collected second communication information to the electronic device. Accordingly, the electronic device may compare the second communication information received from the external device with second signal strength information included in second communication information obtained by the electronic device or previously stored first signal strength information, so as to determine a similarity. The electronic device may determine the distance to the user who carries or operates the external device, based on the result of determining the similarity. If it is determined that the determined distance is at least a predetermined distance distant from the electronic device, the electronic device may automatically change from the unlocked state to the locked state. A similarity may be determined as described above with reference to FIGS. 7A to 7C and the above-mentioned equations.

According to various embodiments, at least some of the devices (for example, modules or functions thereof) or the method (for example, operations) thereof may be implemented by a command or at least one instruction stored in a computer-readable storage medium in a programming module form. When the instruction is executed by one or more processors (e.g., the processor 120 in FIG. 1), the one or more processors may perform a function corresponding to the command. The computer-readable storage medium may be, for example, the memory (e.g., the memory 130 in FIG. 1).

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the disclosure, and vice versa.

The programming module according to the disclosure may include one or more of the aforementioned components or may further include other additional components, or some of the aforementioned components may be omitted. Operations executed by a module, a programming module, or other component elements according to various embodiments of the disclosure may be executed sequentially, in parallel, repeatedly, or in a heuristic manner. Furthermore, some operations may be executed in a different order or may be omitted, or other operations may be added.

According to an embodiment, a non-transitory computer readable recording medium records a program to be executed on a computer, wherein the program includes instructions configured, when executed by a processor, to enable the processor to: identify a first location of an electronic device based on first communication information; obtaining second communication information, obtain second communication information; in response to the identified first location being identified as being included in a second location area adjacent to a previously designated first location area; identify a second location of the electronic device based on at least a part of the obtained second communication information; and change a locked state of the electronic device to an unlocked state, in response to the second location of the electronic device being identified as being included in the first location area.

Various embodiments disclosed herein are provided merely to easily describe technical details of the disclosure and to help the understanding of the disclosure, and are not intended to limit the scope of the disclosure. Accordingly, the scope of the disclosure should be construed as including all modifications or various other embodiments based on the technical idea of the disclosure.

What is claimed is:

1. An electronic device, comprising:
a memory storing instructions; and
a processor configured to execute the instructions to:
identify a first location of the electronic device based on first communication information;
based on the first location being identified as being included in a second location area, obtain second communication information different from the first communication information;
identify a second location of the electronic device based on at least a part of the obtained second communication information; and
change a locked state of the electronic device to an unlocked state, based on the second location of the electronic device being identified as being included in a first location area,
wherein the first location area is included in the second location area.

2. The electronic device of claim 1, wherein the processor is further configured to execute the instructions to:
designate, before identifying the first location, the first location area in a place selected by a user or a place designated based on situation information; and
store, in the memory before identifying the first location, first signal strength information related to a strength of at least one access point signal detected in the first location area.

3. The electronic device of claim 2, further comprising:
a display,
wherein the processor is further configured to execute the instructions to:
control the display to display a first object for selecting a function of automatically changing to the unlocked state and a second object indicating at least one place;
control the display to display pieces of distance information associated with a place indicated by the second object on the display, based on a selection of the second object; and
designate the first location area based on distance information selected from among the displayed pieces of the distance information.

4. The electronic device of claim 1, wherein:
the first communication information comprises global positioning system (GPS) information obtained using a first communication scheme, and physical address information of a device of a network that is obtained using a second communication scheme; and
the second communication information comprises second signal strength information related to a strength of at least one access point signal detected in the first location area.

5. The electronic device of claim 1, wherein the processor is further configured to execute the instructions to:
suspend obtaining the second communication information, based on changing from the locked state to the unlocked state in the first location area;
detect a movement of the electronic device using at least one sensor of the electronic device; and
resume obtaining the second communication information, based on detection of the movement of the electronic device.

6. The electronic device of claim 1, wherein the processor is further configured to execute the instructions to:
suspend obtaining the second communication information, based on a movement of the electronic device not being detected during a predetermined period of time using at least one sensor of the electronic device in the unlocked state; and
resume obtaining the second communication information, based on the movement of the electronic device being detected.

7. The electronic device of claim 1, wherein the processor is further configured to execute the instructions to:
detect a movement of the electronic device using at least one sensor of the electronic device in the unlocked state in the first location area;
identify a movement distance from the first location area and behavior information of a user based on situation information of the user, based on detection of the movement of the electronic device;
resume obtaining the second communication information, based on the identified movement distance being greater than or equal to a predetermined distance;
identify a third location of the electronic device based on the second communication information obtained by resuming obtaining the second communication information; and
return the electronic device from the unlocked state to the locked state, based on the third location of the electronic device being identified as being outside the first location area.

8. The electronic device of claim 1, wherein the processor is further configured to execute the instructions to, in identifying the second location of the electronic device based on the second communication information:
detect at least one access point signal in the first location;
obtain second signal strength information related to a strength of the at least one detected access point signal at designated time intervals;
obtain a similarity value based on the obtained second signal strength information and previously stored first signal strength information; and
identify that the second location is included in the first location area, based on the similarity value being less than or equal to a predetermined similarity threshold value.

9. The electronic device of claim 1, wherein the processor is further configured to execute the instructions to, in identifying the second location of the electronic device based on the second communication information:
maintain the unlocked state, based on a similarity value being identified as being greater than or equal to a predetermined similarity threshold value in a state in which a movement of the electronic device is not detected.

10. The electronic device of claim 1, further comprising:
a display,
wherein the processor is further configured to execute the instructions to control to display, on the display, notification information indicating a change to the unlocked state or a change to the locked state.

11. A location-based operation method performed by an electronic device, the method comprising:
identifying a first location of the electronic device based on first communication information;
based on the first location being identified as being included in a second location area, obtaining second communication information different from the first communication information;

identifying a second location of the electronic device, based on at least a part of the obtained second communication information; and changing a locked state of the electronic device to an unlocked state, based on the second location of the electronic device being identified as being included in a first location area, wherein the first location area is included in the second location area.

12. The method of claim 11, further comprising:

designating, before identifying the first location, the first location area in a place selected by a user or a place designated based on situation information; and storing, before identifying the first location, first signal strength information related to a strength of at least one access point signal detected in the first location area.

13. The method of claim 12, wherein the designating the first location area comprises:

controlling a display of the electronic device to display a first object for selecting a function of automatically changing to the unlocked state and a second object indicating at least one place;

controlling the display to display pieces of distance information associated with a place indicated by the second object, based on a selection of the second object; and designating the first location area based on distance information selected from among the displayed pieces of distance information.

14. The method of claim 11, wherein:

the first communication information comprises global positioning system (GPS) information obtained using a first communication scheme, and physical address information of a device of a network that is obtained using a second communication scheme; and the second communication information comprises second signal strength information related to a strength of at least one access point signal detected in the first location area.

15. The method of claim 11, further comprising:

suspending the obtaining of the second communication information, based on the changing the locked state to the unlocked state in the first location area;

detecting a movement of the electronic device using at least one sensor of the electronic device; and resuming the obtaining of the second communication information, based on detection of the movement of the electronic device.

16. The method of claim 11, further comprising:

suspending the obtaining of the second communication information, based on a movement of the electronic device not being detected during a predetermined period of time using at least one sensor of the electronic device in the unlocked state; and resuming the obtaining of the second communication information, based on the movement of the electronic device being detected.

17. The method of claim 11, further comprising:

detecting a movement of the electronic device using at least one sensor of the electronic device in the unlocked state in the first location area;

identifying a movement distance from the first location area and behavior information of a user based on situation information of the user, based on detection of the movement of the electronic device;

resuming the obtaining of the second communication information, based on the identified movement distance being greater than or equal to a predetermined distance;

identifying a third location of the electronic device based on the second communication information obtained by the resuming the obtaining of the second communication information; and controlling the electronic device to return from the unlocked state to the locked state, based on the third location of the electronic device being identified as being outside the first location area.

18. The method of claim 11, wherein the identifying the second location of the electronic device based on the obtained second communication information comprises:

detecting at least one access point signal in the first location;

obtaining second signal strength information related to a strength of the at least one detected access point signal at designated time intervals;

obtaining a similarity value based on the obtained second signal strength information and previously stored first signal strength information;

identifying that the second location is included in the first location area, based on the similarity value being less than or equal to a predetermined similarity threshold value; and maintaining the unlocked state, based on the similarity value being greater than or equal to the predetermined similarity threshold value in a state in which a movement of the electronic device is not detected.

19. The method of claim 11, further comprising:

controlling to display, on a display of the electronic device, notification information for informing changing the locked state to the unlocked state or changing the unlocked state to the locked state.

20. A non-transitory computer readable recording medium having recorded thereon instructions executable by a processor of an electronic device to perform a location-based operation method comprising:

identifying a first location of an electronic device based on first communication information;

based on the first location being identified as being included in a second location area, obtaining second communication information different from the first communication information;

identifying a second location of the electronic device, based on at least a part of the obtained second communication information; and changing a locked state of the electronic device to an unlocked state, based on the second location of the electronic device being identified as being included in a first location area, wherein the first location area is included in the second location area.

\* \* \* \* \*